June 29, 1954   O. J. LE BOEUF   2,682,219
SALES RECORDER

Filed Dec. 21, 1951   4 Sheets-Sheet 1

Oscar J. LeBoeuf
INVENTOR.

BY
Attorneys

June 29, 1954

O. J. LE BOEUF 2,682,219

SALES RECORDER

Filed Dec. 21, 1951

Oscar J. LeBoeuf
INVENTOR.

BY
Attorneys

June 29, 1954  O. J. LE BOEUF  2,682,219
SALES RECORDER
Filed Dec. 21, 1951  4 Sheets-Sheet 3
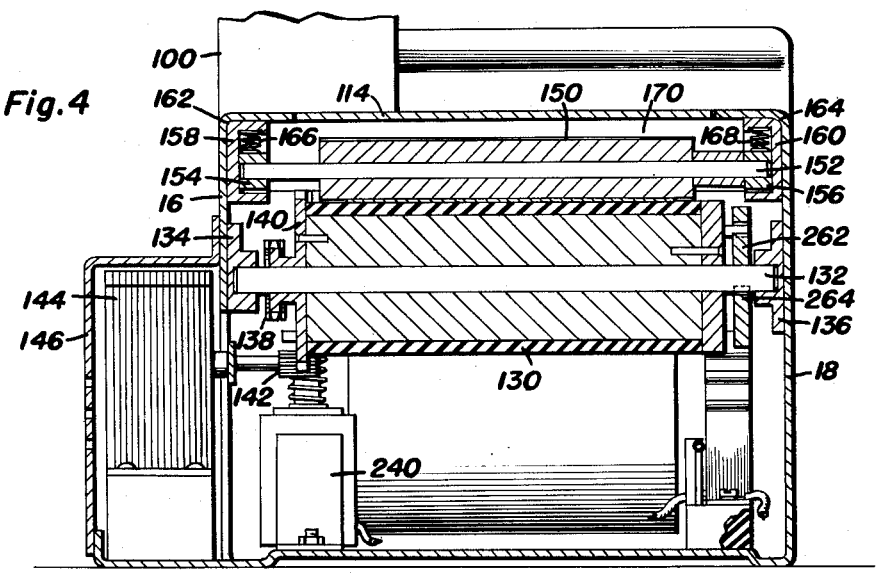
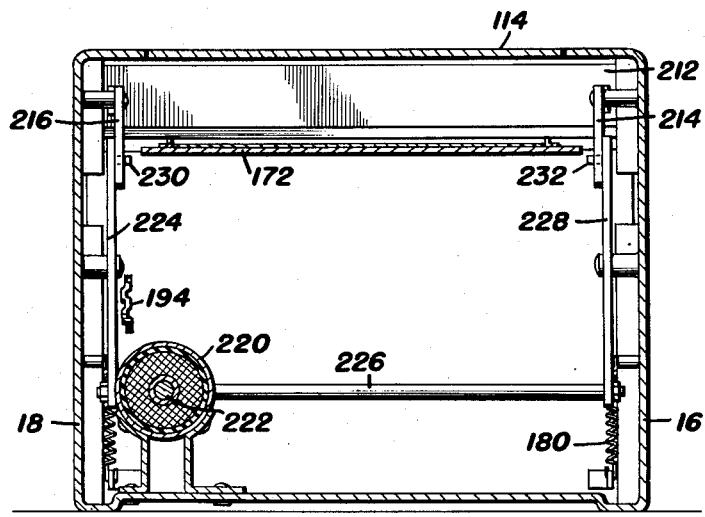
Oscar J. LeBoeuf
INVENTOR.

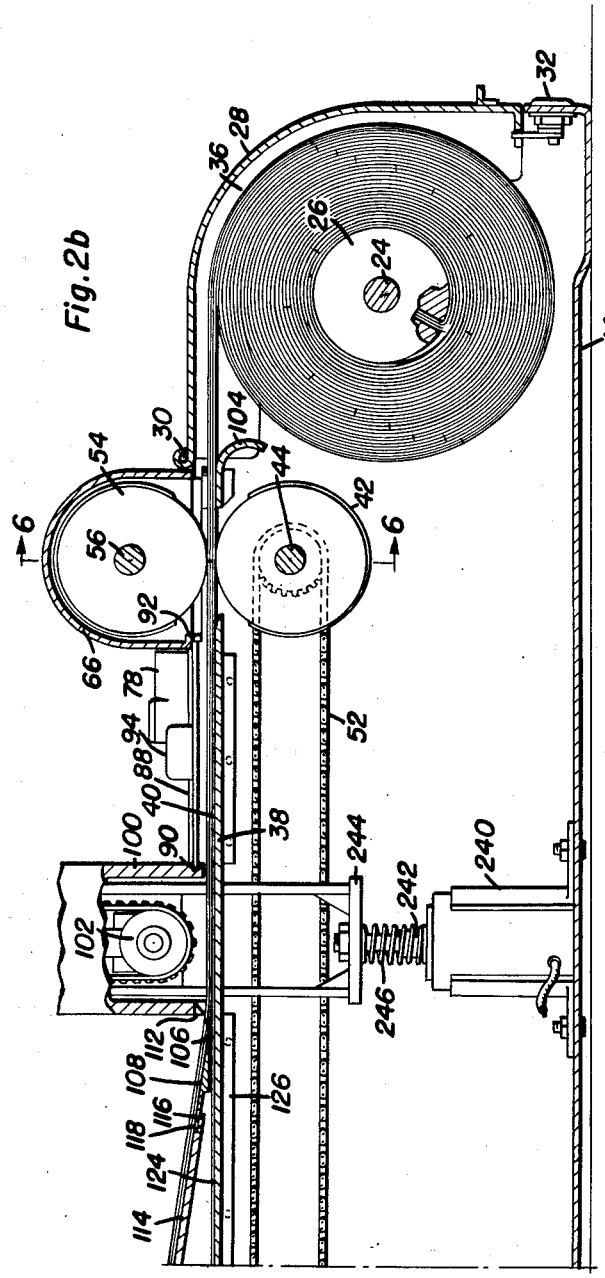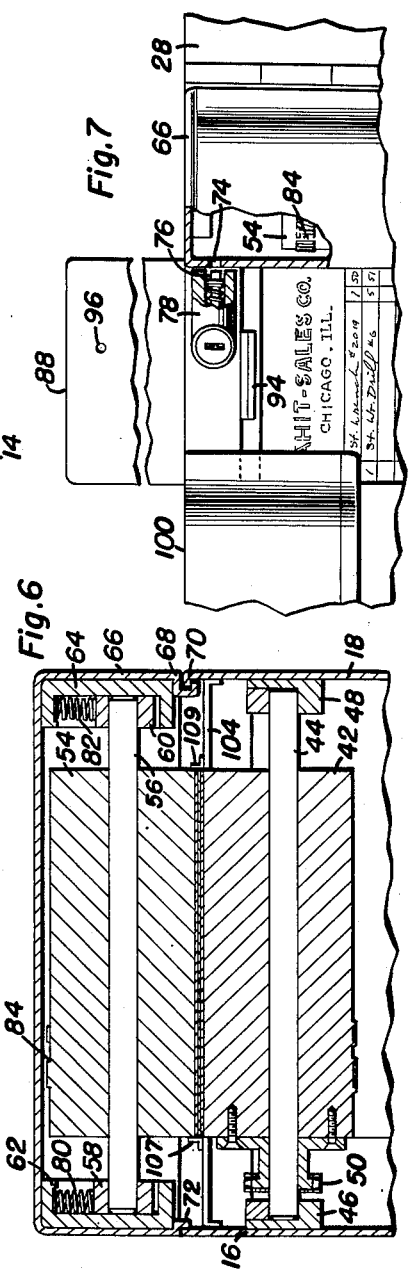

Patented June 29, 1954

2,682,219

UNITED STATES PATENT OFFICE 2,682,219

SALES RECORDER

Oscar J. Le Boeuf, Gary, Ind.

Application December 21, 1951, Serial No. 262,691

5 Claims. (Cl. 101—292)

1

This invention relates to a sales recorder and particularly to a sales recorder having a sales slip which is maintained in inaccessible relation to the operator of the machine and can only be recovered by an authorized person having a key therefor.

In the operation of cash business transactions, it is customary to provide sales slips and to give one of the slips to a customer while the operator maintains the other slip for comparison in the event of a future transaction involving the business. It has been found that some employees are dishonest and in conjunction with customers they make intentional mistakes which are exceedingly costly to the employer. Particularly after the combination of the transaction is known it is frequently possible for a dishonest or disreputable employee to substitute sale slips in the machine so that the cash customer may take advantage of the same. The present invention provides a device in which multiple sales slips are used, one to be given to the customer, another to be maintained for inspection and at least a third slip will be maintained inaccessible to the employee or the customer in an inaccessible lock box where it will be impossible to make substitutions or changes in the sales slip which will be stored away for future reference.

The machine according to the invention comprises a device for holding a roll of multiple layer sales slips and sealing the same so that they cannot be tampered with. The sales slips are passed through an opening through which the sales record can be made after which the time is stamped on the sales record and the sales record is fed out of the machine one to the customer, at least one to the establishment and a third one going through a hidden channel into a completely locked box where it will be cut off from a strip and maintained until the operator with the authorizing key removes the box and removes the slips therefrom.

It is accordingly an object of this invention to provide an improved sales record machine.

It is a further object of this invention to provide a tamper-proof sales record machine.

It is a further object of this invention to provide a sales record machine in which at least one strip is maintained inaccessible to the operator.

It is further object of this invention to provide an automatic machine for delivering the sales slips.

It is further object of this invention to provide a machine which can be completely closed to be tamper proof.

2

It is further object of this invention to provide a sales slip machine in which certain operations are made in sequence on the sales slip.

It is a further object of this invention to provide a sales record machine in which a copy of the sales transaction is deposited in a locked box.

It is a further object of this invention to provide a sales record machine having means to protect the sales record against alteration.

Other objects and many of the attendant advantages of this invention will be apparent from the following detailed description taken in conjunction with the accompanying drawing in which:

Figure 3 is an enlarged horizontal section through the delivery end of the recorder and taken substantially on the plane indicated by the line 3—3 of Figure 2a;

Figure 4 is an enlarged cross section through the driving mechanism and taken substantially on the plane indicated by the line 4—4 of Figure 2a;

Figure 5 is an enlarged cross-section looking through the delivering end of the recorder and taken substantially on the plane indicated by the line 5—5 of Figure 2a;

Figure 6 is an enlarged cross-section through the feed and embossing rolls taken substantially on the plane indicated by the line 6—6 of Figure 2b;

Figure 7 is a fragmentary plan view showing the locking mechanism for the recorder;

Figure 1:
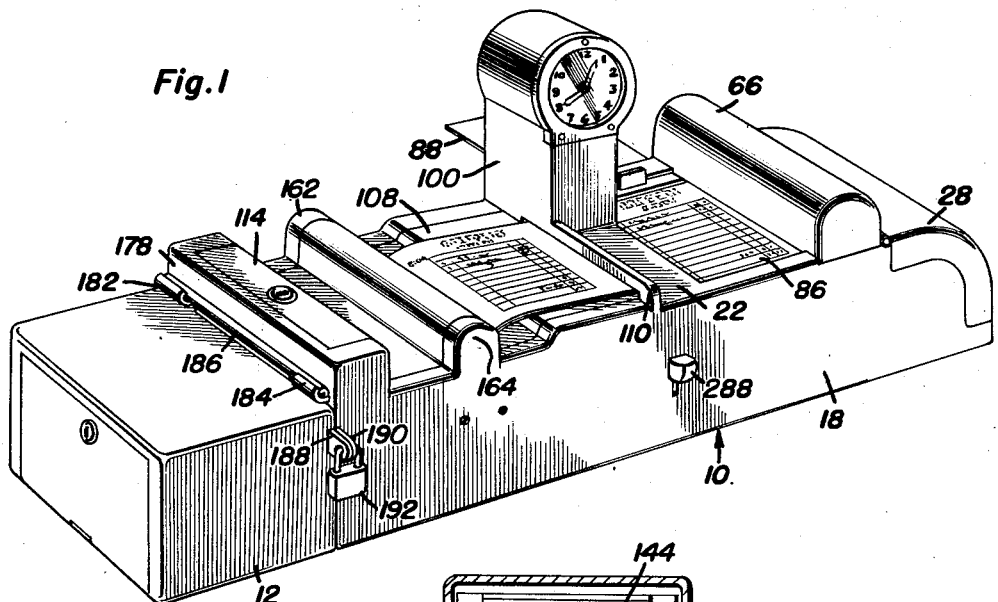
Figure 1 is a perspective view of the sales recorder according to the invention.
Figure 3:
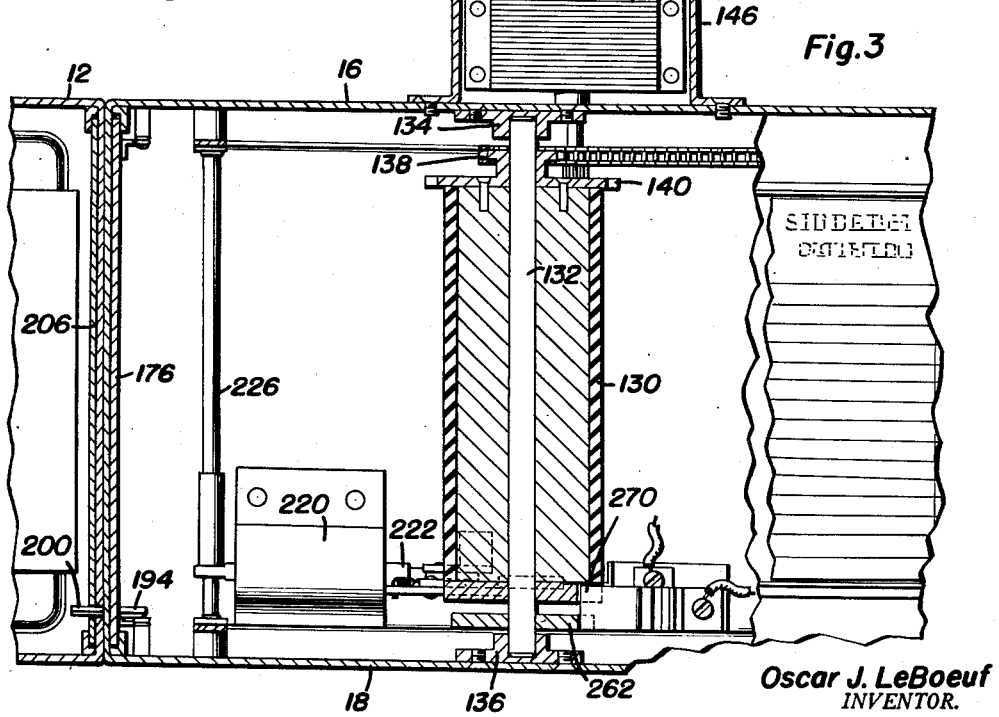
Figure 2A:
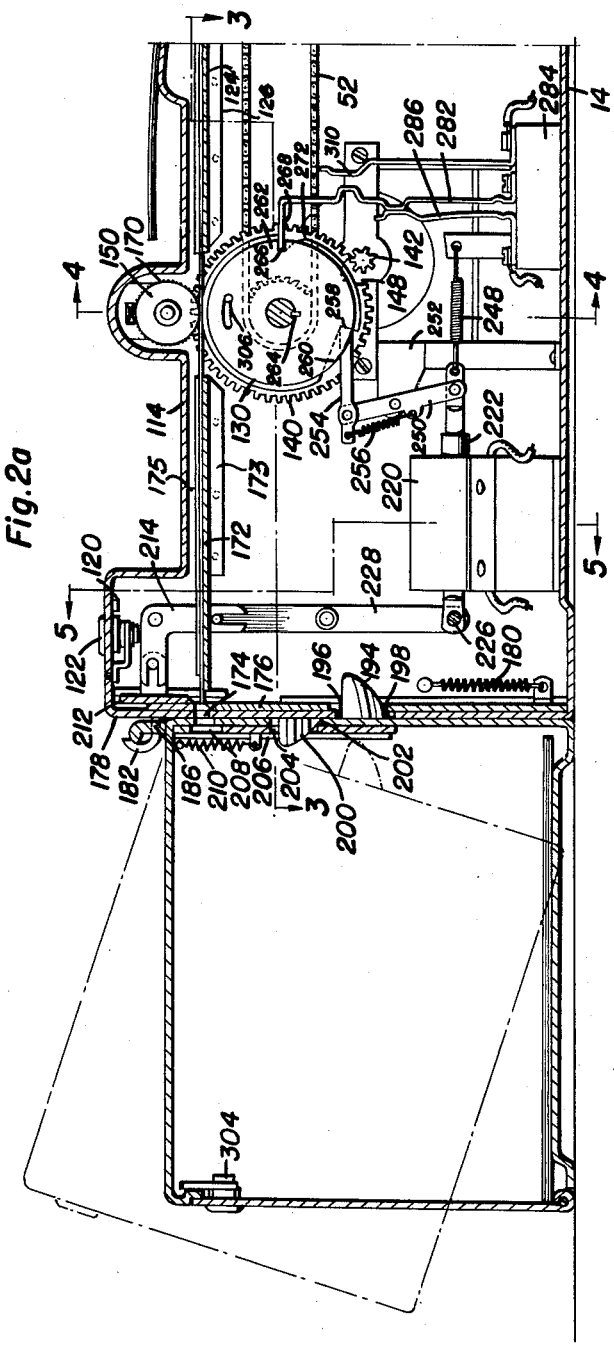
Figure 2 is an enlarged longitudinal vertical section through the sales recorder and broken into two parts 2a and 2b for convenience.
Figure 9:
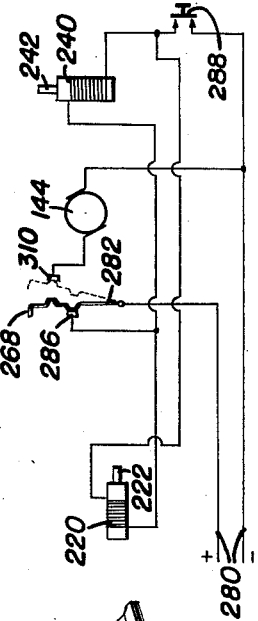
Figure 9 is a circuit diagram showing the electrical control system for the recorder.
Figure 8:
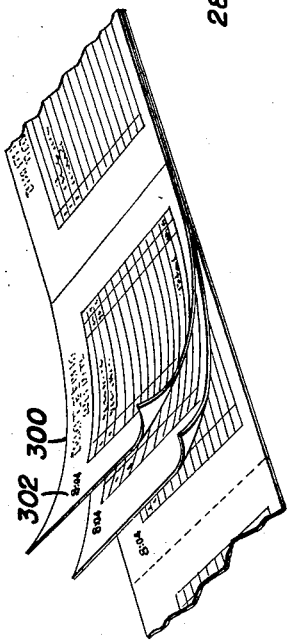
Figure 8 is a perspective view of the sales slip arrangement.

In the exemplary embodiment the recorder is provided with a casing 10 to which is removably secured a lock box 12 for receiving and maintaining in confidence the sales slips from the machine 10.

The casing 10 is provided with a bottom 14, upstanding side walls 16 and 18 and a top 22.

A transverse axle 24 is mounted transversely of the casing 10 adjacent one end thereof and is provided with a clamping roller 26 on which can be mounted a plurality of sales slips preferably in the form of a plurality of or multiple layer slips arranged in roll formation so that a plurality of the layers of slips may be simultaneously fed from the roller. A door 28 is hinged at 30 to the top of the container and is provided with a lock 32 so that unauthorized persons cannot tamper with the roll of sales slips 36.

A support 38 is provided adjacent the top of the casing 10 and provides a surface 40 over which the sales slips are passed. A feed roller 42 mounted on an axle 44 which is journaled in bearings 46 and 48, mounted respectively on the walls 16 and 18. One end of the roller 42 is provided with a sprocket gear 50 on which is mounted a sprocket chain 52 for supplying power to the roller 42, from a source presently to be described.

An idler roller 54 is mounted on the shaft 56 mounted in bearing blocks 58 and 60 which are slidably mounted in bearing blocks 62 and 64 which are in turn mounted in a detachable hood 66 which has a lower interlocking hood 68 interlocked with an inturned edge 70 of the side 18 of the casing. The opposite side 72 of the hood 66 interfits with the side 16 of the casing and is provided with a latch receiving keeper 74 for engaging the latch 76 of the lock 78. The idler roll 54 is resiliently pressed toward the drive roller 42 by means of the springs 80 and 82. The idler roll 54 is preferably provided with indicia affixing devices such as the embossing figures 84 whereof when the idler roller turns on the sales slips carried over the feed roller 42 the proper indicia will be pressed thereon.

The top 22 is provided with a record opening 86 through which access may be had to a portion of the sales slips and the recording surface 40. A slide closure 88 is mounted in grooves 90 and 92 and provided with a thumb handle 94 for sliding the closure 88. The closure 88 is provided with a latch keeper 96 to receive the latch (not shown) carried by the lock 78 so that the closure may be moved into place and locked to prevent tampering with any sales slips which may be exposed on the recording surface 40.

A housing 100 is mounted on the top 22 and contains therein a time imprinting device 102 for imprinting on the sales slips mounted on the surface 40 the exact time to the fraction of a second of the transaction taking place.

A guide 104 is provided between the roll 36 and the feed roll 42. Preferably the guide 104 is provided with side flanges 107 and 109 for maintaining the sales slips in proper alignment between the roll 36 and the surface 40.

A knife edge 106 is provided adjacent the housing 100 for separating the layers of sales slips so that a plurality of layers of sales slips will be deflected upwardly onto a delivery surface 108. A cutter bar 110 extends across the top 22 and is provided with a serrating cutting edge 112 for severing the sales slips which are fed onto the delivery platform 108. A cover 114 has a front edge 116 interlocked with the rear end 118 of the delivery platform 108 while the rear end of the cover 114 is mounted on a bracket 120 adjacent the rear end of the housing 10 and secured in place by means of the lock 122. The guide surface 124 which is substantially a continuation of the support 38 is mounted on brackets 126 secured to the side walls 16 and 18 so that the surface 124 and the cover 114 provide a closed channel extending along the top of the casing 10. A driven feed roll 130 is provided for drawing the strip of sales slips through the covered channel. The feed roll 130 is journaled on a shaft 132 which is journaled in brackets 134 and 136 mounted on the side walls 16 and 18 respectively. The feed roll 130 is provided with a sprocket gear 138 on which the sprocket chain 52 is entrained so that the gears 138 and 50 are secured together by means of the sprocket chain 52 so that the rolls 42 and 130 are driven in unison.

The feed roll 130 is provided with a driving gear 140 which is adapted to mesh with a pinion 142 on a motor 144 which is mounted in a housing 146. The gear 140 is provided with a discontinuity 148 for a purpose presently to be explained.

An idler 150 is mounted on a shaft 152 the ends of which are mounted in bearing blocks 154 and 156 which are slidably mounted in bearing housings 158 and 160 which are housed in ears 162 and 164. The bearing blocks 154 and 156 are resiliently biased to urge the idler roller 150 against the feed roll 130 by means of springs 166 and 168. The surface of the idler roll is provided with roughened surfaces for masserrating the surface of the sales slips so that it will be impossible to make erasures or changes thereof without destroying the paper. A support surface 172 mounted on brackets 173 is substantially aligned with the support 124 and in cooperation with the cover 114 provides a continuously covered channel 175 to a portion adjacent the rear wall of the casing. The casing 10 is provided with an opening 174 which can be covered by a slidable knife 176 which is mounted in proximity to the rear wall 178 and is firmly urged into closing position by means of a spring 180. The rear wall 178 and the casing are provided with hinge projection 182 and 184 in which is engaged the hinged portion 186 on the box 12. The ears 188 on the box and 190 on the casing are secured together by means of a padlock 192 so that the box cannot be removed from the end of casing until the lock has been removed. The box 12 is provided with a key cam 194 which enters a cam slot 196 for engaging the cam side 198 of the sliding cutter 176 and move it downwardly to uncover the opening 174 in the rear wall 178 of the casing 10. Likewise the rear wall 178 is provided with a key cam 200 which extends through a key slot 202 to actuate the cam slot 204 of a sliding door 206 mounted on the interior of the box 12 and urged into closing position for the opening 208 on the box 12 by means of a spring 210. It will thus be seen that the positioning of the box 12 adjacent to and in contact with the rear wall 178 will cause the cam keys 194 and 200 to open the sliding gate to provide a passage between the casing 10 and the interior of the box 12.

A sliding cutter 212 reciprocates on the surface of the sliding cutter 176 and is actuated by a bell crank 214 to reciprocate across the opening and to cut off the sales slips which are fed through the covered channel so that they may drop in the box 12.

Solenoid 220 having an armature 222 is mounted on the bottom of the casing 10 and is connected to a lever arm 224 which is connected by a shaft 226 to a lever arm 228, the arm 224 having a stud 230 engaging the bell crank 216 and the lever arm 228 having a stud 232 engaging the bell crank 214 so that actuation of the solenoid 220 causes its armature to move inwardly to rotate the levers 224 and 228 to oscillate the bell cranks 214 and 216 to reciprocate the cutter 112. The solenoid 240 is also mounted on the base of the casing 10 immediately below the housing 100 provided with an armature 242 on which is mounted a yoke 244 for operating the imprinting mechanism 102. A spring 246 normally urges the yoke 244 upward to maintain the time imprinting device 102 spaced from the sales slips mounted on the recording surface 40.

Armature 222 is normally biased to inoperative position by means of the spring 246.

The sequential control arrangement for the recorder comprises a lever 250 mounted on a bracket 252 and carrying a pawl 254 which is biased by spring 256 against the lower surface of the roll 130 to make contact with a shoulder 258 of a groove 260 cut into the roller adjacent one end thereof. A locking plate 262 is keyed on the shaft 132 by means of a key 264. The locking plate 262 is provided with a locking slot 266 for engaging a detent 268 of a control switch presently to be described. The roller 130 is provided with a locking slot 270 and a cam surface 272 for controlling the detent 268.

The electrical connections for operating the device comprises a feed line 280 having one terminal connected to a switch element 282 mounted on an insulating block 284. The switch element 282 is normally spring biased into contact with the terminal 286 which is connected in parallel to the end turns of the solenoids 220 and 240. When the detent 268 is in the locking slots 258 and 270 the natural bias of the member 282 maintains it in contact with the terminal 286. The output terminals of the solenoids 220 and 240 are connected to one terminal of a switch 288, the handle of which is mounted outside the casing for manual operation to start or initiate the operation of the device.

In the operation of the device assuming that the feed roll 130 is in locked position so that the switch 282 makes contact with the terminal 286 for connecting the solenoids 220 and 240, closure of the switch 288 will apply an impulse to the solenoids 220 and 240 so that the armatures 222 and 242 will be actuated. The actuation of the solenoids 240 will cause the imprinting device 102 to descend into contact with the sales slips 300 and print indicia 302 thereon. Simultaneously the solenoids 220 will pull in its armature 222 and actuate the cutter 212 to cut off the sales slips which has been projected into the box 12 so that it is deposited therein and will be immovable therefrom until an operator who has a key to the slot 204 has opened the box 12. Simultaneously with the cutting off of the sales slip the lever 250 will be operated about the bracket 252 so that the pawl 254 will produce a rotating motion of the shaft 132 so that the cut-out portion 148 of the gear 140 may be brought into contact with the pinion 142 and the cam surface 272 will force the detent 268 out of the locking groove 266 while the loss mechanism 306 is taken up so that the removal of the detent allows the locking plate 262 to move so that it holds the detent in closed position against the terminal 310 which closes a circuit of the motor 144 which will then turn the pinion 142 to drive the gear 140 until the pinion again strikes the cut-out portion 148. Simultaneously to the discontinuity of the pinion 142 and the cut-out portion 148, the locking slot of the locking plate 262 will arrive under the detent 268 and allow the switch member 282 to move away from the contact terminal 310 and stop operation of the motor 144. Likewise, the switch element 282 will again make contact with the terminal 286 so that again pressing the starter button 288 will again initiate the operation of the machine. It will thus be seen that there has been provided a casing all portions of which can be locked against unauthorized tampering. Likewise a device has been provided in which sales slips may be fed through a recording surface so that proper notations may be made thereon after which by pressing a button one or more of the sales slips may be delivered onto a delivery surface and torn off for delivery to the customer and the usual filing thereof. Likewise an auxiliary copy of the sales slips will be fed through the secret covered channel where it will be protected against erasures or other meddlesome operations. The sales slips passing through the channel effectually being clipped off and stored in a safety box provided for the purpose. It will likewise be seen that the removal of the safety box will close all openings into both the box and the machine so that no unauthorized slips can be deposited therein.

After the indicia has been printed on the sales slip the starter button is closed so that the time is put on the sales slip at the time the preceding slip is clipped off in the locked box. Simultaneously the feeding operation of these rollers will be started so that the sales slips will be fed upon one complete revolution of the feed roll.

It is obvious that the feed roll must have a circumference exactly equal to the width of the sales slip so that a complete sales slip will be fed forward at each revolution of the feed roll.

For purposes of exemplification a particular embodiment of this device has been shown and described accordingly to the best present understanding thereof, however, it will be apparent, that many changes and modifications can be made therein without departing from the true spirit of invention.

Having described the invention, what is claimed as new is:

1. A sales recording device comprising a casing, a shaft supporting a roll of multiple layer sales slips in said casing, said casing having an access opening to said shaft, locking means inhibiting unauthorized access to said shaft, a support surface mounted in said casing, a driven feed roll mounted between said shaft and said support surface, said feed roll being operative to feed sales slips from said shaft to said supporting surface, said casing having a record opening communicating with a portion of said support surface, a time imprinting means communicating with a portion of said support surface, means sequentially actuating said time imprinting means and said feed roll, a knife edge adapted to separate the layers of said multiple layer sales slips, a sales slip delivery surface, a portion of said layers being delivered to said sales slip delivery surface, a covered channel in said casing, a portion of said layers passing through said channel, a slip receiving box detachably connected to said casing, said box having a slip receiving opening, said casing having a cooperating opening, said channel communicating with said opening, said box having a closure for said slip receiving opening, resilient means urging said closure to closing position, a cam slot in said box, and a cam on said casing adapted to enter said cam slot, whereby said closure is retracted when said box is positioned with said opening in communication.

2. A sales recording device comprising a casing, a shaft supporting a roll of multiple layer sales slips in said casing, said casing having an access opening to said shaft, locking means inhibiting unauthorized access to said shaft, a support surface mounted in said casing, a driven feed roll mounted between said shaft and said support surface, said feed roll being operative to feed sales slips from said shaft to said supporting surface, said casing having a record opening communicating with a portion of said support surface, a time imprinting means communicating with a portion of said support surface, means sequentially actuating said time imprinting means and said feed roll, a knife edge adapted to separate the layers of said multiple layer sales slips, a sales slip delivery surface, a portion of said layers being delivered to said sales slip delivery surface, a covered channel in said casing, a portion of said layers passing through said channel, a slip receiving box detachably connected to said casing, said box having a slip receiving opening, said casing having a cooperating opening, said channel communicating with said opening, a gate for said channel, resilient means urging said gate into closed position, a cam key slot in said casing, and a cam key mounted on said box, said cam key entering said cam key slot to open said gate when said box and said casing are positioned with said openings in communication.

3. A sales recording device comprising a casing, means supporting a multiple layer roll of sales slips in said casing, a slip supporting surface, a feed roll transferring multiple layer sales slips from said roll to said supporting surface, said casing having an opening exposing a portion of the top layer of the slips on said support, a time imprinting means mounted over a portion of the top sales slip on said support, means for separating said layers of sales slips, a channel receiving one of said sales slips, a feed roll drawing said sales slip through said channel, a cutter mounted transverse of said channel, a solenoid operatively connected to said time imprinting means, a second solenoid operatively connected to said cutter, a motor, said feed rolls being operatively connected together, a pinion operated by said motor, a drive gear secured on one of said feed rolls for engagement with said pinion, a discontinuity in said drive gear, a two-way switch in said casing, a switch element biased to close said switch in a predetermined position, a locking plate for said feed roll, a locking slot in said locking plate, a detent on said biased switch element entering said locking slot, a lost motion connection between said feed roll and said locking plate, a cam slot in said roll, said detent entering said cam slot when engaging the locking slot in said locking plate, and lever means actuated by energization of one of said solenoids rotating said feed roll a predetermined amount to move said discontinuity past said pinion, said rotation causing said cam slot to lift said detent out of the locking slot and closing said switch in its second position, said switch thereby deenergizing said solenoids and energizing said motor, manual switch means for initiating said operation.

4. In a sales recording device having a cutter and a feed roll, a sequential control comprising, a shaft, said feed roll journaled on said shaft, a locking plate fixed on said shaft, a selector switch, a switch element biased to select one terminal of said switch, a solenoid, said solenoid being connected to said one terminal, a motor, said motor being connected to another terminal of said selector switch, a pinion driven by said motor, a drive gear on said feed roll, a section of teeth removed from said drive gear, a locking slot in said locking plate, a cam slot in said feed roll, a detent on said biased switch element, said detent entering said slots to close said one terminal of said selector switch, a lever pivoted adjacent said roll, one end of said lever being operatively connected to said solenoid, a shoulder on said roll, a spring pressed pawl on said lever and engaging said pawl, a lost motion connection between said roll and said locking plate, and a starting switch, said starting switch when closed energizing said solenoid, said solenoid when energized oscillating said lever and rotating said feed roll whereby said pinion engages said drive gear and said cam lifts said detent out of said slots deenergizing said solenoid and energizing said motor.

5. A sales recording device comprising a casing, means supporting a multiple layer roll of sales slips in said casing, a slip supporting surface, a feed roll transferring multiple layer sales slips from said roll to said supporting surface, said casing having an opening exposing a portion of the top layer of the slips on said support, a time imprinting means mounted over a portion of the top sales slip on said support, means for separating said layers of sales slips, a channel receiving one of said sales slips, a feed roll drawing said sales slip through said channel, a cutter mounted transverse of said channel, a solenoid operatively connected to said time imprinting means, a second solenoid operatively connected to said cutter, a motor, said feed rolls being operatively connected together, a sequential control comprising, a shaft, said second mentioned feed roll journaled on said shaft, a locking plate fixed on said shaft, a selector switch, a switch element biased to select one terminal of said switch, said motor being connected to another terminal of said selector switch, a pinion driven by said motor, a drive gear on said feed roll, a section of teeth removed from said drive gear, a locking slot in said locking plate, a cam slot in said feed roll, a detent on said biased switch element, said detent entering said slots to close said one terminal of said selector switch, a lever pivoted adjacent said roll, one end of said lever being operatively connected to said second solenoid, a shoulder on said roll, a spring pressed pawl on said lever and engaging said pawl, a lost motion connection between said roll and said locking plate, and a starting switch, said starting switch when closed energizing both of said solenoids, said second solenoid when energized oscillating said lever and rotating said feed roll whereby said pinion engages said drive gear and said cam lifts said detent out of said slots deenergizing said solenoids and energizing said motor.

References Cited in the file of this patent

UNITED STATES PATENTS

| Number | Name | Date |
|---|---|---|
| 1,264,302 | Ireland | Apr. 30, 1918 |
| 1,269,979 | Tily et al. | June 18, 1918 |
| 1,736,034 | Cooper | Nov. 19, 1929 |
| 1,836,546 | Oliver | Dec. 15, 1931 |
| 1,909,006 | Pfeiffer | May 16, 1933 |
| 1,930,447 | Borchers | Oct. 10, 1933 |
| 1,999,928 | Healy | Apr. 30, 1935 |
| 2,017,195 | Anderson et al. | Oct. 15, 1935 |
| 2,150,761 | Craig et al. | Mar. 14, 1939 |
| 2,522,784 | Guilbert | Sept. 19, 1950 |

FOREIGN PATENTS

| Number | Country | Date |
|---|---|---|
| 281,368 | Great Britain | Nov. 30, 1927 |